United States Patent

Morris

[15] 3,690,187
[45] Sept. 12, 1972

[54] SENSING MECHANISM FOR LINEAR SERVO ACCELEROMETER

[72] Inventor: Harold D. Morris, 11 Westover Court, Orinda, Calif. 94563

[22] Filed: Jan. 27, 1971

[21] Appl. No.: 110,282

Related U.S. Application Data

[63] Continuation of Ser. No. 822,744, May 7, 1969, abandoned, which is a continuation of Ser. No. 559,284, June 21, 1966, abandoned.

[52] U.S. Cl. ............................................. 73/517 B
[51] Int. Cl. ............................................ G01p 15/08
[58] Field of Search ............................... 73/516, 517

[56] References Cited

UNITED STATES PATENTS

| 2,780,101 | 2/1957 | Kinkel | 73/398 |
| 2,985,021 | 5/1961 | Lewis et al. | 73/517 |
| 3,046,794 | 7/1962 | Fischel | 73/517 |
| 3,074,279 | 1/1963 | Morris | 73/517 |
| 3,132,521 | 5/1964 | Krupick et al. | 73/517 |
| 3,176,521 | 4/1965 | Clark | 73/517 |
| 3,344,675 | 10/1967 | Hellen | 73/517 |

*Primary Examiner*—Richard C. Queisser
*Assistant Examiner*—Herbert Goldstein
*Attorney*—Flehr, Hohbach, Test, Albritton & Herbert

[57] ABSTRACT

Sensing mechanism for a linear servo accelerometer having a rigid bar which is pivotally mounted on each end and having a restoring coil rigidly secured thereto and in which a non-magnetic conducting member is carried within the confines of the coil and in which a pick off coil is provided to sense the position of the member.

6 Claims, 4 Drawing Figures

PATENTED SEP 12 1972  3,690,187
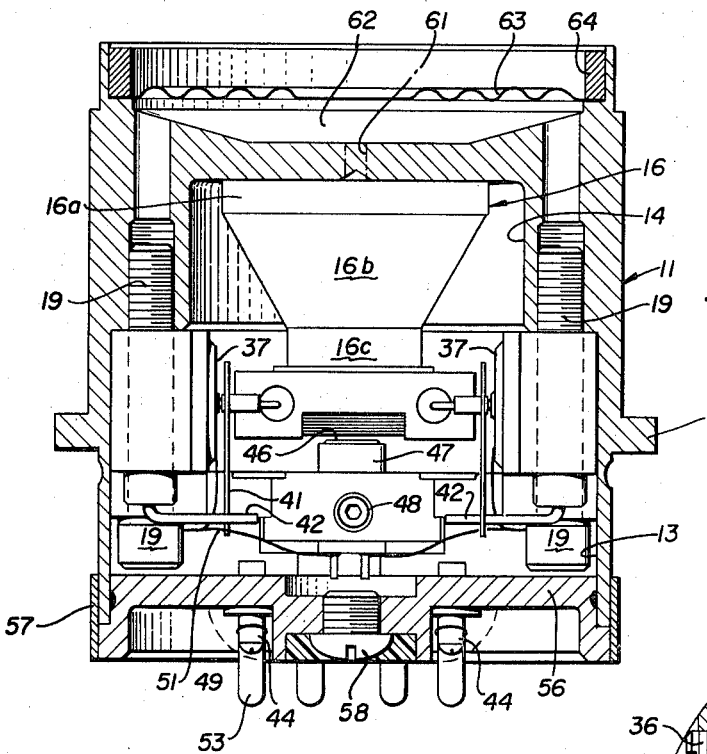
Fig. 1
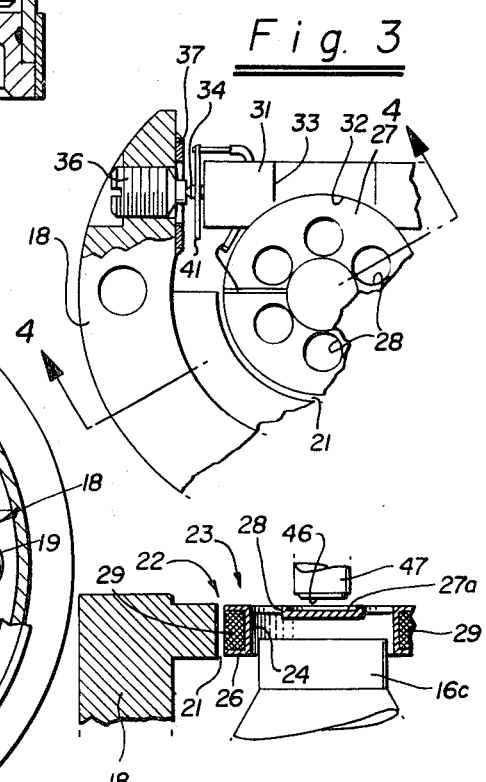
Fig. 3
Fig. 4
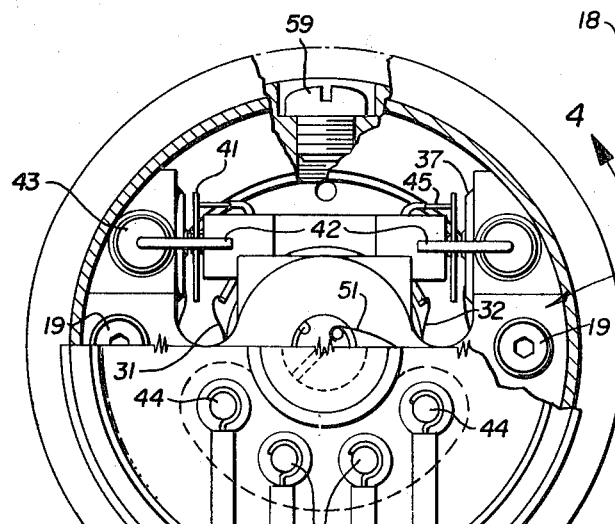
Fig. 2
54 — ELECTRONIC CIRCUITRY
INVENTOR.
Harold D. Morris
BY
Flehr   Swain
Attorneys

SENSING MECHANISM FOR LINEAR SERVO ACCELEROMETER

This application is a continuation of Ser. No. 822,744 filed May 7, 1969, now abandoned, which is a continuation of Ser. No. 559,284 filed June 21, 1966, now abandoned.

This invention relates to a sensing mechanism and more particularly to a sensing mechanism for a linear servo accelerometer.

Sensing mechanisms have heretofore been provided for linear servo accelerometers. However, it has been found that such sensing mechanisms have objectionable limitations. For example, it has been found in sensing mechanisms utilizing flexure suspensions that there is a substantial null drift with changes with temperature and time. It is believed that the change in null drift with time is caused by the fact that the suspension system of the sensing mechanism rests in a condition of stress when the power is off. In addition, it has been found that in certain accelerometers, undesirable mechanical resonances occur which interfere with the operation of the sensing mechanism. There is, therefore, a need for a new and improved sensing mechanism for use with linear servo accelerometers.

In general, it is an object of the present invention to provide a sensing mechanism for a linear servo accelerometer which overcomes the above named disadvantages.

Another object of the invention is to provide a sensing mechanism of the above character in which the null or zero position is stable.

Another object of the invention is to provide a sensing mechanism of the above character which is particularly adapted for use with low range linear servo accelerometers and which can operate successfully in the presence of very high vibration levels.

Another object of the invention is to provide a sensing mechanism of the above character in which very little d-c offset is produced in the presence of a high alternating component of acceleration due to vibration.

Another object of the invention is to provide a sensing mechanism of the above character which is constructed in such a manner that the mechanical resonances which can be created in the mechanism are minimized so that such resonances do not interfere with operation of the sensing mechanism.

Another object of the invention is to provide a sensing mechanism of the above character which is relatively stiff and unyielding in the range of frequencies encountered by the sensing mechanism.

Another object of the invention is to provide a sensing mechanism of the above character in which symmetrical geometry is utilized for substantially all the parts of the sensing mechanism.

Another object of the invention is to provide a sensing mechanism of the above character in which the effective magnetic field has been increased substantially.

Additional objects and features of the invention will appear from the following description in which the preferred embodiment is set forth in detail in conjunction with the accompanying drawings.

Referring to the drawings:

FIG. 1 is a cross-sectional view of a sensing mechanism incorporating the present invention.

FIG. 2 is a bottom plan view of the sensing mechanism shown in FIG. 1 with certain portions broken away and showing the same connected to electronics normally used with a servo linear accelerometer.

FIG. 3 is a further detail view in plan showing additional features of the sensing mechanism.

FIG. 4 is an enlarged detail view in cross-section of a portion of the sensing mechanism taken along the line 4—4 of FIG. 3.

In general, the sensing mechanism for a linear accelerometer consists of a body in which magnetic means is mounted within the body. A movable element of conducting non-magnetic material is disposed in the body. A restoring coil is connected to the movable element so that as the movable element moves, the restoring coil moves with it. Means is provided for mounting the restoring coil on the body so that the restoring coil is disposed in the magnetic field formed by the magnetic means. The mounting means includes a separate rigid bar affixed to the restoring coil and means for mounting the bar to permit pivotal movement of the bar and the restoring coil secured thereto. A pick-off coil is disposed in the vicinity of the movable element to sense the position of the movable element and is connected to electronics which is utilized for supplying current to the restoring coil.

More particularly as shown in the drawings, the sensing mechanism consists of a body or outer case 11 which has a substantially cylindrical configuration and which has a mounting flange 12 extending outwardly from the side wall of the same. The body is provided with a large cylindrical recess 13 which opens at one end and a smaller cylindrical recess 14 which opens into the recess 13. A magnet 16 of a suitable material such as Alnico is mounted in the recess 14. The magnet 16 can take any suitable form and as shown can be formed with a cylindrical portion 16a and a truncated conical portion 16b. A smaller cylindrical plate-like pole piece 16c is mounted on the portion 16b.

A large horseshoe-shaped mounting plate 18 is mounted within the recess 13 and is secured to the body or case 11 by screws 19. The mounting plate 18 in combination with the body 11 forms a yoke to complete the magnetic path for the magnet 16. A circular air gap 21 is provided between the pole piece 16c and the mounting plate 18 through which the lines of magnetic flux pass.

A restoring coil assembly 22 is disposed in the air gap 21 between the upper end of the magnet 16 and the mounting plate 18 and consists of a bobbin 23 formed of a suitable material such as magnesium. As shown particularly in FIG. 4, the bobbin is formed with a cylindrical wall 24 which is provided with outwardly extending parallel spaced flanges 26. The bobbin is also provided with an integral flat plate 27 on one end of the cylindrical wall 24. The plate 27 is provided with a centrally disposed recessed portion 27a and is also provided with a plurality of circular holes 28 arranged in a circle about the recessed portion 27a. The plate 27 serves as a movable element which is formed of a conducting non-magnetic material which is used for a purpose hereinafter described. A circular coil or loop 29 of conducting wire is wound on the bobbin 23 between the flanges 26. This coil 29 is utilized as a force restoring coil as hereinafter described.

Means is provided for mounting the restoring coil assembly 22 on the body 11 and consists of a rigid cylindrical bar 31 which is provided with an arcuate cut-out 32 that receives one side of the restoring coil assembly 22 as shown particularly in FIG. 3. The restoring coil assembly 22 is affixed to the bar equidistant from the ends thereof, by suitable material such as a cement. The rigid bar 31 is also provided with an additional cut-out 33 to counter-balance the weight of the plate 27 in order to make the axis of sensitivity of the sensing mechanism perpendicular to the plane of the restoring coil 29. Means is provided for pivotally mounting the rigid bar 31 within the body 11 and consists of pivot and jewel assemblies in the form of pivot bearing members 34 affixed to the ends of the bar 31 and jewelled screws 36 threaded into the sides of the mounting plate 18 and which engage the pivot bearing members 34. Electrostatic shields 37 are secured to the sides of the mounting plate 18.

A hair spring 41 with a very low spring constant is associated with each of the pivot and jewel assemblies and is supported by a terminal 42 which is mounted in an insulated block 45 provided in the mounting plate 18. The other end of the hair spring 41 is connected to a conductor 43 which is connected to one end of the coil 29. Thus, it can be seen that the torque or restoring coil 29 is connected to the terminals 42. The terminals 42 are connected by circuitry (not shown) to terminals 44.

A pick-off coil 46 of the type described in U.S. Pat. No. 3,074,279 is provided for sensing the position of the plate 27 which serves as the movable element. The pick-off coil 46 is mounted upon a pick-off block 47 of a suitable insulating material so that the pick-off coil lies in a plane which is substantially parallel to but spaced from the movable element 27. The block 47 is slidably mounted in an outwardly curved portion of the mounting plate 18 and is held in the desired position by a set screw 48. The pick-off coil 46 is connected to terminals 49 mounted in the block 47 which are connected by leads 51 to terminals 52. The terminals 44 and 52 are connected by leads 53 to suitable electronic circuitry represented by the block 54. The electronic circuitry can be of the type described in U.S. Pat. No. 3,074,279.

The terminals 52 and 54 are mounted in a cover plate 56 which is mounted on one end of the body and is secured to the end of the body by means of a sleeve 57. A screw 58 is provided in the cover plate 56 to permit filling of the entire interior of the body or case 11 with a suitable oil, such as a silicone oil. An additional oil filling screw 59 is provided in the side wall of the body 11. The other end of the body 11 is provided with a hole 61 through which oil can flow into a chamber 62 formed between the body and a diaphragm 63. The diaphragm 63 is held in place by a retaining ring 64.

Operation and use of the sensing mechanism may now be briefly described as follows. Let it be assumed that the sensing mechanism has been connected to the electronics 54. As explained in U.S. Pat. No. 3,074,279, such electronics includes an oscillator which is connected to the pick-off coil. The position of the movable element from the plate 27 affects the oscillator so that the pick-off coil, in fact, senses the position of the movable element. The output of the oscillator is detected and amplified. A certain portion of the amplified output is fed back to the restoring coil 29 to apply a restoring force to the restoring coil and the movable element 27 carried by it to return and maintain the movable element in a mid-point or null position. Thus, a current is supplied to the restoring coil which in the magnetic field in the air gap causes a force to be applied to the movable element 27 which is directly opposite to that of the force of acceleration or deceleration.

The sensing mechanism hereinbefore described has many unique advantages in that it can be readily designed so that it is very small and light in weight and is still extremely rugged so that it performs properly in the presence of very high vibration levels. A particular advantage is the fact that the sensing mechanism can be utilized in a low range accelerometer, for example, of ½ G range which will operate properly in the presence of high vibration levels, as for example, 30 G.

It can be seen that the construction of the sensing mechanism is such that it is substantially symmetrical and can be made so that it is very small. By the use of such minute geometry and the utilization of a very stiff restoring coil assembly 22 which is supported by the rigid bar 31, the mechanical resonances which can occur in the sensing mechanism have been reduced to a minimum. In addition, the sensing mechanism is designed so that it is very stiff and unyielding in the normal range of frequencies, as for example, up to 1,000 cycles. The use of the rigid bar 31 ensures that there is very little compliance within the sensing mechanism, thus eliminating structural resonances within the normal range of vibration which would be encountered. Thus, the movable element is centered and forms a part of the restoring coil assembly 22. In addition, the pick-off coil 46 is centered in the mechanism and directly overlies the movable element or plate 27 which is also centered in the coil.

When the sensing mechanism is oil filled, the holes 28 provided in the plate 27 permit the free flow of oil in a symmetrical fashion around the disc or plate 27 so that forces produced by an alternating component of acceleration on the sensitive axis of the accelerometer are minimized. In other words, the geometry of the sensing mechanism is such that organized flow of oil or pumping, which would produce a net force on the face of the plate 27, is effectively cancelled.

The geometry utilized for the sensing mechanism herein described is particularly advantageous in that it permits positioning of the pick-off coil 46 in a manner which is symmetrical with the entire sensing mechanism and which it is unnecessary to provide any additional structural support which is disposed on the sides or away from the main torque coil 29. As can be seen particularly from FIG. 2, a horseshoe-shaped mounting plate 18 has been provided in which the cut-out in the plate is utilized for means for mounting the torque coil. By using a mounting plate of this type which has a substantial portion cut away, it has been found that the magnetic field created by the magnet is forced into the air gap away from the cut-out in the mounting plate to thereby increase the magnetic lines of flux at a point where they are most effective with respect to the restoring coil 29 to produce the largest force per unit of current in the restoring coil.

The high effectiveness of the restoring coil produces in combination with the described electronics a very high restoring force to the restoring coil assembly 22, with only a minute deflection angle to produce a signal in pick-off coil 46. The torques produced by the weak (low spring constant) hairsprings are many orders of magnitude lower than the servo-produced torques, thus yielding a mechanism which is extremely insensitive to temperature effects on the springs, and thus very stable in zero or null.

It is apparent from the foregoing that there has been constructed a new and improved sensing mechanism which is particularly useful for linear servo accelerometers, which has many distinctive features which is not subject to a null drift with temperature changes or with time.

I claim:

1. In a sensing mechanism for a linear servo accelerometer, an outer case having a generally cylindrical recess therein, magnetic means mounted in the recess in the case and including a generally cylindrical pole piece centrally disposed in the recess to form a generally circular air gap with the case across which magnetic lines of flux pass, a circular restoring coil, a generally planar rigid member secured to the restoring coil, means including pivot and jewel assemblies carried by the case and engaging the rigid member for mounting the rigid member for pivotal movement about a pivot axis and serving to position said restoring coil in said air gap so that the restoring coil is symmetrical to the case and magnetic means, said restoring coil, said rigid member and said means for mounting the rigid member lying in the same general plane, said rigid member being mounted in relatively close proximity to said restoring coil and having its major dimension extending in a direction which is substantially parallel to the axis of pivotal movement of the restoring coil, a movable element in the form of a plate of conducting non-magnetic material carried by the restoring coil and being disposed on the same side of the pivot axis as the restoring coil, and pick-off means symmetrically disposed in the vicinity of the movable element to sense the position of the movable element.

2. A sensing mechanism as in claim 1 wherein said rigid member is in the form of an elongate bar and wherein said means engaging the rigid member engages the ends of the rigid bar and wherein said restoring coil is secured to the rigid bar intermediate the ends of the rigid bar.

3. A sensing mechanism as in claim 1 wherein said movable member is centrally disposed with respect to said restoring coil.

4. A sensing mechanism as in claim 3 together with a bobbin and wherein said restoring coil is wound on to said bobbin and wherein said movable element forms a part of the bobbin.

5. A sensing mechanism as in claim 4 wherein said movable element is formed with a plurality of holes to permit the flow of fluid therethrough.

6. A sensing assembly as in claim 1 wherein said magnetic flux lines travel in a radial path through the air gap.

* * * * *